Patented Mar. 10, 1953

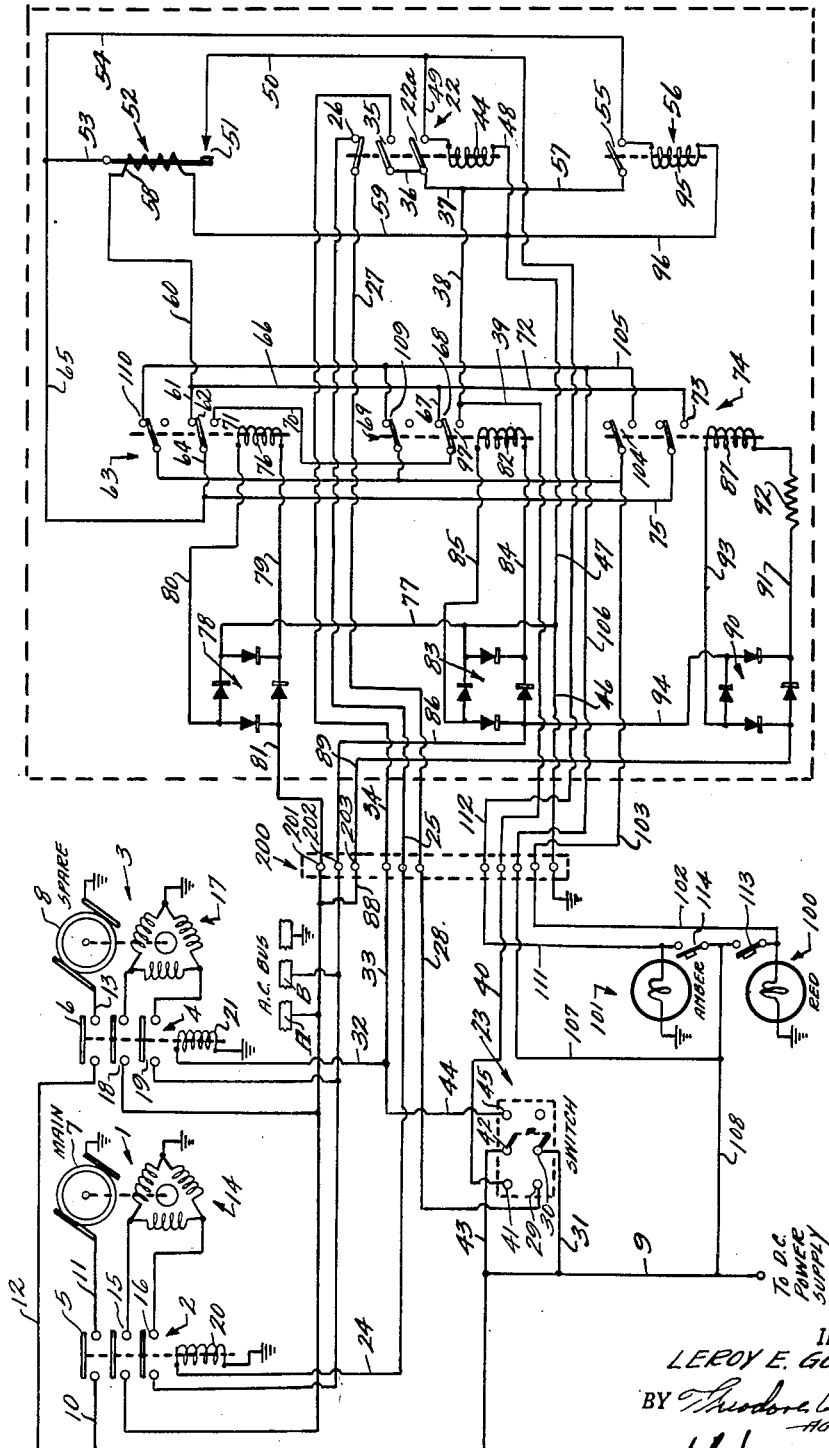

2,631,248

UNITED STATES PATENT OFFICE 2,631,248

INVERTER CONTROL AUTOMATIC CHANGE-OVER FOR SINGLE OR THREE-PHASE APPLICATION

Le Roy E. Gottman, Xenia, Ohio

Application May 29, 1951, Serial No. 228,960

5 Claims. (Cl. 307—45)

(Granted under Title 35, U. S. Code (1952), sec. 266)

The invention described herein may be manufactured and used by or for the Government for governmental purposes without payment to me of any royalty thereon.

This invention relates to improvements in automatic relay systems to effect operation of a spare inverter upon failure of a main inverter.

In the art of automatic change-over relay systems for inverters, it is desirable to prevent the relaying system from switching from the main inverter to the spare inverter when the main inverter has not failed. Various relaying systems have been proposed which provide a time delay switching system, such for example as the one disclosed in Patent Number 2,410,678, dated November 5, 1946, issued to M. K. Parkhurst.

Change-over from main inverter operation to spare inverter operation when no failure of the main inverter exists is called "nuisance change-over" and may occur under two conditions (1) when the system is first put into operation and (2) when the system has been in operation for some time and a momentary overload or fault exists on the system.

Relaying systems such as that disclosed in the above mentioned patent provide adequate protection against "nuisance change-over" when a momentary overload or fault exists during running condition of the main inverter but do not adequately protect against "nuisance change-over" when the system is first put into operation.

In the prior art change-over systems the time delay to prevent "nuisance change-over" is usually set at a time delay of approximately 6 seconds which is adequate for momentary faults to clear but is not long enough to permit some inverters to attain their normal running condition.

It is an object of this invention to prevent "nuisance change-over" when the inverter system is first put into operation.

Another object of this invention is to provide a novel automatic relay system which causes operation of a control relay only after the system has first attained its normal running condition.

A further object of this invention is to provide a signal or indicating system for inverter change-over systems which not only indicates that a faulty condition exists in the system but also indicates which inverter is in operation.

A still further object of this invention is to provide a change-over relay system for use with either single phase or three phase inverters.

Other objects and advantages of this invention will be apparent from the following detailed description in conjunction with the drawing which illustrates one form of the improved automatic change-over relay system.

The drawing is a single diagrammatic view of a relay system embodying my invention.

Referring to the drawing, the main inverter generally indicated at 1 is controlled by switch 2 and the spare inverter generally indicated at 3 is controlled by switch 4. Contacts 5 and 6 of switches 2 and 4 respectively are in the energizing circuits of motor 7 and motor 8 respectively. The energizing circuit of motor 7 extends from the D. C. bus 9 through conductor 10, contacts 5 of switch 2, conductor 11, through the motor 7 to ground. The energizing circuit for motor 8 extends from D. C. bus 9, conductor 12, contacts 6 of switch 4, conductor 13, through the motor 8 to ground.

The main inverter 1 has a poly-phase generator 14 whose output supplies the A. C. bus through contacts 15 and 16 of switch 2 and the spare inverter 3 has a poly-phase generator 17 whose output supplies the A. C. bus through contacts 18 and 19 of switch 4. The switches 2 and 4 are provided with operating coils 20 and 21 respectively.

From the above description it will be apparent that when the switch 2 is energized, power will be supplied to the A. C. bus from the inverter 1 and when the switch 4 is energized power will be supplied to the A. C. bus from the inverter 3.

Switches 2 and 4 are controlled by change-over relay 22 and manually operated switch 23 through the following circuits: the energizing circuit for the operating coil 20 of switch 2 extends from ground through the operating coil 20, conductor 24, conductor 25, contacts 26 of change-over relay 22, conductor 27, conductor 28, contacts 29 and 30 of manual switch 23 and conductor 31 to the D. C. bus 9. An energizing circuit for operating coil 21 of switch 4 extends from ground through the operating coil 21, conductors 32, 33, 34, contacts 35 of change-over relay 22, conductors 36, 37, 38, 39, 40, contacts 41, 42 of manual switch 23 and conductor 43 to D. C. bus 9. Another energizing circuit for operating coil 21 of switch 4 extends from ground, through operating coil 21, conductors 32, 44, contacts 45, 42 of manual switch 23, and conductor 43 to D. C. bus 9.

The energizing circuit of operating coil 44 of change-over relay 22 extends from ground through the conductors 46, 47, 48 operating coil 44, conductor 49, conductor 50, contacts 51 of time delay control relay 52, conductors 53, 54, contacts 55 of isolation relay 56, and to the D. C. bus by way of conductors 57, 38, 39, 40, contacts 41, 42 of manual switch 23 and conductor 43. When the change-over relay 22 has been energized through the above mentioned circuit it completes its own holding circuit though an obvious circuit includes contacts 22A of change-over relay 22.

The energizing circuit for heater 58 of time delay control relay 52 extends from ground through conductors 45, 46, 47, 59, heater 58, conductors 60, 61, contacts 62 of phase A under-voltage relay 63, conductors 64, 65, 54, contacts 55 of operation relay 56, conductors 57, 38, 39, 40, contacts 41, 42 of manual switch 23 and conductor 43 to D. C. bus 9. Another circuit which parallels the contacts 62 of the above traced circuit includes conductors 66, 67, contacts 68 of phase B under-voltage relay 69, conductor 70 and contacts 71 of phase A under-voltage relay 63. Still another circuit which parallels contacts 62 of phase A under-voltage relay 63 includes conductors 66, 72, contacts 73 of over-voltage relay 74 and conductor 75.

The energizing circuit for the operating winding 76 of phase A under-voltage relay 63 extends from ground through conductors 46, 77, full wave rectifier 78, conductor 79, energizing winding 76, conductor 80, conductor 81, to A. C. bus phase A conductor.

The energizing circuit for operating winding 82 of phase B under-voltage relay 69 extends from ground through conductors 46, 77, full wave rectifier 83, conductor 84, operating winding 82, and conductors 85 and 86 to phase B conductor.

The energizing circuit for operating winding 87 of over-voltage relay extends from phase A through conductors 88, 89, full wave rectifier 90, conductor 91, voltage reducing resistor 92, operating winding 87, conductors 93, 94, 86 to phase B conductor.

The energizing circuit for operating winding 95 of isolation relay 56 extends from ground through conductors 46, 47, 96, energizing winding 95, conductors 54, 65, 64, contacts 71 of phase A under-voltage relay 63, conductors 70, contacts 97 of phase B under-voltage relay 69, conductors 39, 40, contacts 41, 42 of manual switch 23 and conductor 43 to the D. C. bus. When the isolation relay 56 has been energized through the above mentioned circuit it completes its own holding circuit through an obvious circuit including its contacts 55.

*Signaling circuit*

The change-over relay system above described is further provided with a fault signal indicator 100 and a signal indicator 101 that indicates which inverter is in operation. The fault indicator 100 is energized through the circuit from ground through the indicator 100, conductors 102, 103, contacts 104 of over-voltage relay 74, conductors 105, 106, 107 to the D. C. bus 9 through conductor 108. The contacts 104 of the above mentioned circuit are paralleled by two other circuits one including contacts 109 of phase B under-voltage relay 69 and another circuit including contacts 110 of phase A under-voltage relay 63.

The signal indicator 101 is energized through a circuit from ground through the signal indicator 101, conductors 111, 112 to the junction point of conductors 50 and 49 thus whenever potential is applied to conductors 50 and 49 during the relaying operations the signal indicator 101 will be energized.

The signal indicators 100 and 101 are each provided with a push to test switch 113 and 114 respectively.

*Operation*

From the above detailed description of the relay system, it will be obvious that when the manual switch 23 is placed in the position to the left as viewed in the drawing, the main inverter 1 will be immediately energized since the operating coil 20 of switch 2 will be energized over contacts 26 of change-over relay 22 and as soon as the inverter has attained its normal running condition, the phase A under-voltage relay 63 and the phase B under-voltage relay 69 will close their respective contacts 71 and 97 which completes the energizing circuit for isolation relay 56 which will then close its contacts 55 thus completing its own holding circuit over those contacts. The condition as thus far described is the condition of the relays during normal running condition of the system.

Let it be assumed now that while the main inverter 1 is supplying power to the A. C. bus an under-voltage condition exists on the phase A conductor. Under these conditions the phase A under-voltage relay 63 will close its contacts 62 thus causing the heater of time delay control relay 52 to be energized and if this condition persists for a predetermined length of time, for example 4 seconds, the time delay control relay 52 will close its contacts 51 thus energizing the operating coil 44 of change-over relay 22 which will de-energize the main inverter by opening its contacts 26 and energize the spare inverter by closing its contacts 35.

Let it now be assumed that the main inverter is supplying power to the A. C. bus and an under-voltage condition exists under phase B conductor. Under these conditions the phase B under-voltage relay 69 will close its contacts 68 and cause the heater 58 of time delay control relay 52 to be energized and thus cause the same change-over relay operation as in the case of a phase A fault to be effected.

If it be assumed that the main inverter is supplying power to the A. C. bus and an over-voltage condition exists, the over-voltage relay 74 will close its contacts 73 and thus cause the heater 58 of time delay control relay 52 to be energized and the same change-over relay operation as described in the case of a phase A under-voltage condition will be effected.

Let it now be assumed that the manual switch 23 is first put in the left hand position as viewed in the drawing and although the main inverter is energized an under-voltage condition exists. Under these conditions either the phase A under-voltage relay 63 or the phase B under-voltage relay 69 or both of those relays will fail to close their respective contacts 71 and 97. Since both of those contacts 71 and 97 are not closed the isolation relay 56 will not be energized and therefore the energizing circuit for heater 58 of time delay control relay 52 will not be complete and an automatic change-over operation will not be effected. However, the presence of such a condition will be readily apparent to the operator since the fault indicator 100 will be energized and the signal indicator 101 will not be energized thus indicating that an automatic change-over operation has not been effected. With such an indication, the operator merely throws the manual switch 23 to the right hand position as viewed in the drawing and thus completes a direct energizing circuit for operating coil 21 of switch 24 and thereby energizes the spare inverter and de-energizes the main inverter.

In summarizing it is pointed out that if the manual switch 23 is put in the left hand position as viewed in the drawing and the main inverter 1 has attained its normal running condition, automatic change-over to the spare inverter will be effected under a condition to under-voltage or over-voltage provided that that condition obtains for a predetermined length of time depending upon the setting of time delay control relay 52.

Although the over-voltage and under-voltage relays have been shown as the D. C. type, thus requiring the use of rectifiers in their energizing circuits it is obvious that alternating current relays could be substituted therefor.

By providing voltage reducing resistor 92 in the energizing circuit of over-voltage relay 74 it is possible to use identical relays for the over-voltage and under-voltage relays and thus simplify the manufacture of my improved change-over relay system.

The automatic change-over relay system of my invention is particularly well suited for either single phase or poly-phase operation since in order to use this relay system with single phase systems, it is merely necessary to connect together terminals 201, 202 of connector 200 and connect terminal 203 of connector 200 to ground.

While I have, in accordance with the patent statutes, shown and described my invention as applied to a particular system and embodying various devices diagrammatically shown, changes and modifications will be obvious to those skilled in the art and I, therefore, aim in the appended claims to cover all such changes and modifications which fall within the scope of my invention.

What I claim as new and desire to secure by Letters Patent in the United States is:

1. An automatic change-over relay system to switch to a spare inverter operation upon failure of a main inverter comprising; a relay having two positions of operation, means responsive to one position of said relay for causing operation of said main inverter, means responsive to a second position of said relay for causing operation of said spare inverter, a circuit for energizing said relay including contacts of a control relay, a circuit for energizing said control relay, a condition responsive relay responsive to an electrical condition of said main inverter, said condition responsive relay having a first and second set of contacts said first set of contacts being in said energizing circuit of said control relay, an isolation relay having an energizing circuit including said second set of contacts of said condition responsive relay and contacts in said energizing circuit of said control relay operated by said isolation relay.

2. An automatic change-over relay system to switch to a spare inverter operation upon failure of a main inverter comprising; a condition responsive relay having a first set of contacts which are closed when said relay is de-energized and a second set of contacts which are closed when said relay is energized, means to cause said condition responsive relay to respond to an electrical condition of said main inverter, a control relay having an energizing circuit including said first set of contacts, an isolation relay having an energizing circuit including said second set of contacts, said isolation relay having a set of contacts in the energizing circuit of said control relay which are closed when said isolation relay is energized.

3. For use in an automatic change-over inverter control system having a main inverter, a spare inverter, a change-over indicating device and a failure indicating device; an improved relaying system comprising; a condition responsive relay having a first set of contacts which are closed when said relay is de-energized and a second set of contacts which are closed when said relay is energized, a control relay having an energizing circuit including said first set of contacts, an isolation relay having an energizing circuit including said second set of contacts, said isolation relay having a set of contacts in the energizing circuit of said control relay which are closed when said isolation relay is energized, circuit means energized in response to an operative condition of said control relay to effect operation of said change-over indicating device and a second circuit means energized in response to an operative condition of said condition responsive relay to effect operation of said failure indicating device.

4. An automatic change-over inverter control system comprising; a main inverter, a spare inverter, a control switch having an energizing circuit, means responsive to said control switch when energized to cause operation of said spare inverter, means responsive to said control switch when de-energized to cause operation of said main inverter, said energizing circuit of said control relay including a first set of contacts and a second set of contacts, condition responsive means to cause said first set of contacts to close when said condition is present and to cause a third set of contacts to close when said condition is not present, means responsive to closing of said third set of contacts to cause said second set of contacts to close and means to retain said second set of contacts closed after they have once been actuated to closed position.

5. For use in an automatic change-over inverter control system having a main inverter, a spare inverter, a change-over indicating device and a failure indicating device; an improved relaying system comprising; a control relay having an energizing circuit; means to cause said main inverter to be effective when said control relay is de-energized and to cause said spare inverter to be effective when said control relay is energized, said energizing circuit of said control relay including a first set of contacts and a second set of contacts, condition responsive means to cause said first set of contacts to close and to cause said failure indicating device to be actuated when said condition is present and to cause a third set of contacts to close when said condition is not present, means responsive to closing of said third set of contacts to cause said second set of contacts to close, means to retain said second set of contacts closed after they have once been actuated to closed position and means actuated when said control relay is energized to cause said change-over indicating device to be actuated.

LE ROY E. GOTTMAN.

REFERENCES CITED

The following references are of record in the file of this patent:

UNITED STATES PATENTS

| Number | Name | Date |
| --- | --- | --- |
| Re. 17,041 | Lovell | July 17, 1928 |
| 1,966,810 | Burnham | July 17, 1934 |
| 2,103,786 | Janetschke | Dec. 28, 1937 |
| 2,157,858 | Miller | May 9, 1939 |
| 2,219,459 | Spenser | Oct. 29, 1940 |
| 2,247,167 | Edwards | June 24, 1941 |
| 2,343,411 | Grandstaff et al. | Mar. 7, 1944 |
| 2,465,794 | Fereday | Mar. 29, 1949 |
| 2,567,876 | Dahline | Sept. 11, 1951 |